(12) United States Patent
Barimani et al.

(10) Patent No.: US 10,287,882 B2
(45) Date of Patent: May 14, 2019

(54) EARTH WORKING MACHINE AND METHOD FOR WEAR-OPTIMIZED OPERATION OF AN EARTH WORKING MACHINE

(71) Applicant: Wirtgen GmbH, Windhagen (DE)

(72) Inventors: Cyrus Barimani, Königswinter (DE);
Günter Hähn, Königswinter (DE);
Stefan Wagner, Bad Honnef (DE)

(73) Assignee: Wirtgen GmbH (DE)

( * ) Notice: Subject to any disclaimer, the term of this patent is extended or adjusted under 35 U.S.C. 154(b) by 388 days.

(21) Appl. No.: 15/196,317

(22) Filed: Jun. 29, 2016

(65) Prior Publication Data

US 2017/0009578 A1 Jan. 12, 2017

(30) Foreign Application Priority Data

Jul. 10, 2015 (DE) .................. 10 2015 111 249

(51) Int. Cl.
*E01C 23/088* (2006.01)
*E21C 25/10* (2006.01)
*E21C 35/18* (2006.01)
*G05D 1/02* (2006.01)

(52) U.S. Cl.
CPC ............ *E21C 25/10* (2013.01); *E01C 23/088* (2013.01); *E21C 35/18* (2013.01); *G05D 1/0219* (2013.01)

(58) Field of Classification Search
CPC ......... E21C 35/18; E21C 25/10; E01C 23/088
See application file for complete search history.

(56) References Cited

U.S. PATENT DOCUMENTS

| | | | |
|---|---|---|---|
| 4,006,936 | A | 2/1977 | Crabiel |
| 4,655,634 | A | 4/1987 | Loy et al. |
| 6,201,567 | B1 | 3/2001 | Kuroda |
| 6,887,013 | B2 | 5/2005 | Ley et al. |
| 6,921,230 | B2 | 7/2005 | Silay |
| 6,990,390 | B2 | 1/2006 | Groth et al. |
| 7,422,391 | B2 | 9/2008 | Holl et al. |
| 7,905,682 | B2 | 3/2011 | Holl et al. |
| 7,984,953 | B2 | 7/2011 | Gaertner et al. |
| 8,386,196 | B2 | 2/2013 | Wagner et al. |

(Continued)

FOREIGN PATENT DOCUMENTS

| AT | 382683 B | 3/1987 |
|---|---|---|
| CN | 101246357 A | 8/2008 |

(Continued)

OTHER PUBLICATIONS

European Search Report in corresponding European Patent Application No. EP 16 17 5421, dated Nov. 24, 2016, 6 pp. (not prior art).

(Continued)

*Primary Examiner* — Sunil Singh
(74) *Attorney, Agent, or Firm* — Lucian Wayne Beavers; Gary L. Montle; Patterson Intellectual Property Law, PC (57) ABSTRACT

The invention relates to an earth working machine and to a method for wear-optimized operation of such an earth working machine. Provision is made in this context that machine parameters with which the earth working machine is operated are adapted, in consideration of material properties of the substrate to be worked, in such a way that favorable wear behavior exists for the earth working tools being used.

32 Claims, 4 Drawing Sheets

(56) References Cited

U.S. PATENT DOCUMENTS

| | | |
|---|---|---|
| 8,668,274 B2 | 3/2014 | Gaertner et al. |
| 8,775,099 B2 | 7/2014 | Wagner et al. |
| 9,103,079 B2 | 8/2015 | Schlenker et al. |
| 9,121,145 B2 | 9/2015 | Berning et al. |
| 9,605,393 B2 | 3/2017 | Schlenker et al. |
| 9,873,994 B2 | 1/2018 | Wagner et al. |
| 2004/0120766 A1 | 6/2004 | Silay |
| 2005/0207841 A1 | 9/2005 | Holl et al. |
| 2008/0153402 A1 | 6/2008 | Arcona et al. |
| 2011/0272997 A1 | 11/2011 | Gaertner et al. |
| 2013/0035874 A1 | 2/2013 | Hall et al. |
| 2013/0082510 A1* | 4/2013 | O'Neill ............... E21C 31/02 299/42 |
| 2014/0116776 A1 | 5/2014 | Marx et al. |
| 2014/0191560 A1 | 7/2014 | Gaertner et al. |
| 2014/0324364 A1 | 10/2014 | Wagner et al. |
| 2015/0149027 A1 | 5/2015 | Paulsen et al. |
| 2016/0258119 A1* | 9/2016 | Krolnik ............... E01C 23/088 |
| 2016/0298452 A1* | 10/2016 | Doheny, II ............... E21C 25/10 |
| 2017/0009578 A1 | 1/2017 | Barimani et al. |

FOREIGN PATENT DOCUMENTS

| | | |
|---|---|---|
| CN | 101666622 A | 3/2010 |
| CN | 104563174 A | 4/2015 |
| CN | 206279431 U | 6/2017 |
| DE | 3411892 A1 | 10/1985 |
| DE | 3218754 C2 | 11/1985 |
| DE | 3505408 A1 | 8/1986 |
| DE | 3616170 A1 | 3/1987 |
| DE | 3818213 A1 | 11/1989 |
| DE | 10015005 A1 | 10/2001 |
| DE | 10203732 A1 | 8/2003 |
| DE | 10213017 A1 | 10/2003 |
| DE | 102005016346 B3 | 1/2007 |
| DE | 102008045470 A1 | 3/2008 |
| DE | 102014015661 A1 | 4/2015 |
| EP | 1039036 A2 | 9/2000 |
| EP | 1396581 B1 | 3/2004 |
| JP | 941863 A | 2/1997 |

OTHER PUBLICATIONS

Office Action from corresponding China application No. 201610537714. 5, 7 pages (not prior art).

Search Report from corresponding China application No. 2016105377145, 2 pages (not prior art).

Caterpillar Operation & Maintenance Manual, PR-1000 Pavement Profiler, Jul. 1990, 78 pages.

ARRA Basic Asphalt Recycling Manual, U.S. Department of Transportation Federal Highway Administration, 108 pages, 2001.

Liang et al., Vision-Based Automatic Tool Wear Monitoring System, Jun. 25-27, 2008, Proceedings of the 7th World Congress on Intelligent Control and Automation, Chongqing, China, pp. 6031-6035.

* cited by examiner

EARTH WORKING MACHINE AND METHOD FOR WEAR-OPTIMIZED OPERATION OF AN EARTH WORKING MACHINE

BACKGROUND

In the context of road reconstruction by milling and the removal of mineral deposits by means of surface miners (also by milling), the earth working tools that are used, and in particular the milling bits, are subject to a continuous wear process. Replacement is advisable once the tools reach a specific wear state, since otherwise the ongoing process loses efficiency.

The wear state of the bits and bit holders can be assessed by visual inspection by the machine driver. The wear state of the bit holders is usually assessed by way of so-called wear markings. The wear state of the bits is assessed by way of the longitudinal wear and the rotational symmetry of the wear pattern.

Inspecting the wear state of bits and holders is very time-intensive, and is unproductive since nothing can be produced during that time. The overall process is disrupted and the availability of the earth working machine is thus additionally decreased. It is therefore advantageous if the expected inspection intervals are very long or are optimized in terms of the working sequence, and if the required frequency of inspections is therefore low and they occur at times favorable for operation of the machine.

Replacement of the earth working tools, i.e. of the bits and optionally of the associated bit holders, also requires a large expenditure of time during which the earth working machine cannot be used. Costs are additionally incurred for the tools to be replaced. Maintenance of the earth working tools thus represents a large cost factor for operation of the earth working machine.

The wear on the earth working tools is influenced substantially by the material properties of the substrate to be worked, and by the machine parameters with which the earth working machine is operated. A machine driver will attempt to set the machine parameters in such a way that economic specifications, for example working a specific area within a specified time or in the shortest possible time, are complied with, without stressing the earth working machine more than necessary. This setting is made subjectively, however, and depends substantially on the experience of the respective machine driver. Machine parameter settings that yield good working output, but do not sufficiently consider wear on the earth working tools, are often selected. The result of this is that the earth working tools wear, and must be replaced, prematurely. It can also happen that different combinations of machine parameter settings result in comparable working output values but in greatly different wear behavior.

The material properties of the substrate to be worked can change during the working process. In mining, for example, it can happen that while traveling over a deposit of material to be removed, the hardness of the raw material suddenly rises ("hard spot"). Increased wear then occurs on the tools.

DE 10 2008 045 470 A1 (U.S. Pat. No. 8,386,196) discloses a method for quantitative determination of wear on earth working tools (bits and bit holders) of a milling machine. Here the position in space of at least one point on the earth working tool is sensed. This measurement result is then compared with a reference value, so that the wear on the tool can be sensed quantitatively. A measurement system preferably operating in noncontact fashion, which operates reliably under the harsh environmental conditions in the region of the milling drum and with which the automated wear determination can be accomplished, is provided in order to carry out the method. The method enables automated recognition of the wear state of the earth working tools so that they can be replaced when the wear limit is reached, but without limiting the wear rate itself.

DE 10 2014 015 661 A1 (U.S. Pat. No. 9,103,079) describes a milling machine for earth working, for example for road construction. The mobile milling machine comprises a rotor having milling tools mounted thereon. The working height of the rotor and thus the milling depth, the rotor rotation speed, and the travel speed are adjustable. The spacing of a dimensioning mechanism with respect to the rotor can furthermore be adjusted, and the degree to which the milled material is crushed can thereby be influenced. Associated with the milling machine are various sensors for determining ground characteristics (e.g. density, material thickness, or detection of objects present beneath the ground), travel speed, rotor working height, rotor rotation speed, or the orientation of the dimensioning mechanism. Based on the sensor signals the milling machine can be controlled in such a way that a collision between the rotor and objects present beneath the ground, and thus damage to the rotor, is avoided. The milling machine can furthermore be controlled, as a function of soil density or material thickness, in such a way that a desired mixing ratio of the removed material is achieved. The speed of the milling machine and the rotation speed of the rotor are set as a function of the ground characteristics in such a way that the material is cut most efficiently to the necessary grading or granulometry. In the case of a high material density, for example, the travel speed and/or the rotor rotation speed can be reduced in order to achieve the necessary grading. It is disadvantageous in this context that wear on the rotor or on the milling tools mounted thereon is not considered in the setting of machine parameters. Machine parameters that result in highly efficient cutting performance can thus lead to severe wear with correspondingly short replacement intervals and the high costs associated therewith.

SUMMARY OF THE INVENTION

An object of the invention is to furnish an earth working machine, and a method for operating such an earth working machine, which enable an economically optimized working process.

The object is achieved by a method for wear-optimized operation of an earth working machine, in particular a road milling machine, a surface miner, or the like, at least one material property of the material to be removed being sensed in a processing device, and at least one machine parameter of a machine parameter set of the earth working machine being ascertained, as a function of at least the one material property, as a target machine parameter for establishing wear-optimized operation. The rate at which the earth working tools of the earth working machine wear depends substantially on two factors: on the one hand the material properties of the material to be removed, and on the other hand the existing machine parameters with which the earth working machine is operated. While the material properties are defined by the material to be worked, according to the present invention the machine parameters are set in such a way that the earth working machine is operated with the minimum possible wear or with a specified or permitted rate of wear on the earth working tools. The machine parameters respectively suitable for this depend on the existing material properties. Provision is therefore made that the material properties are sensed by the processing device and are considered in ascertaining the at least one target machine parameter. For purposes of the invention, "sensing" of the material properties means that they are, for example, inputted or are delivered to the processing device via corresponding signal lines, or that data from which the processing device determines the material properties are inputted into or delivered to said device. Various machine parameters that influence wear are advantageously grouped into a machine parameter set with which the earth working machine is operated. Different target values for one or more machine parameters of the machine parameter set are respectively provided depending on the existing material properties, which values result, in the context of the existing material properties, in a low or a specified rate of wear on the earth working tools. The invention thus makes possible wear-optimized operation of the earth working machine, with the result that maintenance costs for checking and replacing the working tools are kept low. Checking cycles for inspecting the wear state of the earth working tools can be lengthened. The earth working tools need to be changed less often, which results in extended maintenance intervals and lower replacement part costs. The wear can furthermore be influenced in such a way that maintenance or replacement of the earth working tools can occur at a favorable point in time, for example during a stoppage of the earth working machine for which provision is made in any case. Downtime costs can thereby be kept low.

Economical operation of the earth working machine, taking into consideration both wear and thus maintenance costs as well as the work performed by the earth working machine and thus the revenue obtained, can be achieved by the fact that in addition to the wear, the working output of the earth working machine is optimized. For example, the machine parameter or parameters can be set in such a way that the greatest possible working output is achieved with the minimum possible wear on the earth working tools.

Advantageously, provision can be made that the at least one target machine parameter, or a derivation thereof, is indicated, in particular displayed, to an operator, preferably during the operating process, or is processed in a control unit acting on the earth working machine, in order to set or specify at least one target machine parameter. A possible optimization potential in the context of machine parameter selection can thus be presented to the operator, for example during a milling operation. In addition, a recommendation can be made to the operator, during the milling operation, to modify one or more machine parameters, for example a milling drum rotation speed. This can be accomplished by direct display of the value to be set, or by displaying a direction in which to adjust the machine parameter, for example by displaying a corresponding arrow. The operator can then input the respective target machine parameter or parameters into the control unit via input means that are present. Provision can furthermore be made that the target machine parameter or parameters that are ascertained are conveyed directly to the control unit of the earth working machine and are set by it.

Provision can advantageously be made that, prior to the start of or during a working process of the earth working machine, the operator enters into the processing device at least one material property of the material to be removed and one or more specified machine parameters and/or job parameters, which are taken into consideration in ascertaining the target machine parameter or parameters or the derivation of the target machine parameter or parameters. The specification of machine parameters or job parameters allows consideration of economic specifications that are to be met by the work of the earth working machine. An advance rate, for example, can be indicated as a specified machine parameter. The further machine parameters of the machine parameter set are then adapted, in consideration of the inputted material properties, in such a way that wear-optimized operation occurs. It is likewise possible, for example, to indicate a requested working output as a job parameter, the machine parameters with which that working output can be achieved with the minimum possible wear on the earth working tools then being ascertained for that purpose.

With regard to the machine parameters, the wear on the earth working tools is influenced substantially by the milling depth, the advance rate, and the milling drum rotation speed, and by the machine parameters (engine output and torque) associated therewith and transferred to the milling drum. Provision can thus be made that the machine parameter set encompasses at least a milling depth and/or an advance rate and/or a milling drum rotation speed and/or an engine output and/or a torque.

The material properties principally influencing the wear on the earth working machine can be taken into consideration by the fact that an abrasiveness and/or a hardness and/or a material type and/or a material composition and/or a temperature and/or a layer structure is determined as a material property. Indications such as "asphalt" or "concrete," with their known material properties, can be considered, for example, as possible material types.

The operation of an earth working machine is subject to further requirements, for example in order to meet economic or time-related specifications. The machine parameters resulting therefrom are often in conflict with those that result in minimum possible wear. In order to meet such specifications as well, provision can be made that a planned change in the material to be worked, for example a milling distance, a milling output, a milling work task, and/or a working time, can be used as a job parameter. A mass or milled volume of material to be removed can be specified, for example, as a milling work task. This can then yield a required milling distance and milling depth. A task per unit time, for example a mass to be worked per unit time, a material volume to be worked per unit time, or an area or distance to be worked per unit time, can be defined as a milling output. The working time can contain the time at which a predetermined task must be completed. It can further indicate when a favorable point in time exists for replacing the earth working tools, for example at the end of a shift or at a planned shutdown of the earth working machine. The machine parameters can then be set so that the earth working tools do not need to be replaced before that point in time, so that additional stoppage times can be avoided. Because the job parameters, material properties, and (where applicable) specified machine parameters are considered, the remaining machine parameters can be set so as to enable economical operation of the earth working machine with the minimum possible wear on the earth working tools and with the lowest possible maintenance costs.

According to a preferred variant embodiment of the invention, provision can be made that from the at least one material property and/or from at least one machine parameter of the machine parameter set and/or from a change in a wear state of at least one earth working tool, in particular of a bit and/or of a bit holder, at least one characteristic value is calculated which represents a ratio between a wear on the earth working tool caused by a milling work task performed by the earth working machine and the milling work performed; and that the at least one target machine parameter is determined in such a way that the characteristic value assumes a value as low as possible. In the context of operation of an earth working machine with the machine parameters of a machine parameter set, a specific wear quantity is produced in proportion to the milling work that is done, as a function of the material properties that are present. This wear can be determined from the material properties and from the existing machine parameters, or can be ascertained directly, for example by visual inspection of the earth working tools. The characteristic value can be stored in a database, for example as a function of machine parameters or machine parameter sets and material properties. For existing material properties, it is thus possible to select the machine parameters or machine parameter set with which the lowest characteristic value is associated. If specific machine parameters of a machine parameter set are specified because of job parameters or specified machine parameters set by the operator, and therefore cannot be optimized in terms of wear, the machine parameter set having the lowest characteristic value can be selected from the remaining setting possibilities, and can be set.

Determination of the change in the wear state, for example by way of a visual inspection, additionally provides the possibility of ascertaining further characteristic values for the respectively existing material data and machine parameters with which a milling work task has been carried out, and adding them to the database. The result is to create a self-teaching system to which, for example, characteristic values for material properties and machine parameter settings not hitherto considered can be delivered for future optimization of the machine parameters.

Alternatively to the aforesaid characteristic value, its reciprocal can also be used, the machine parameters then being optimized to the highest possible value.

Provision can advantageously be made that the milling work performed is outputted from the control unit of the earth working machine or is inputted by the operator into the processing device. The milling work performed can thus, for example, be taken into consideration in determining the characteristic value.

The wear state of the earth working tools can be determined in various ways. For example, provision can be made that the change in the wear state is ascertained using a noncontact measurement method. It is furthermore conceivable for the wear state to be determined upon a replacement of the at least one earth working tool. It is also possible to draw a conclusion as to the wear state from the required replacement intervals for the at least one earth working tool, or from the number of earth working tools, in particular bits, to be replaced at each replacement interval. The noncontact measurement method in particular enables a quick determination of the wear state without long downtimes for the earth working machine. The alternative variants, on the other hand, can be implemented inexpensively.

According to a possible embodiment of the invention, provision can be made that the current wear state of at least one earth working tool, in particular of a bit and/or of a bit holder, is sensed; that a residual wear capacity until a specified wear limit is reached is ascertained from the current wear state; and that the residual wear capacity is considered in ascertaining the at least one target machine parameter. The machine parameters can thereby, for example, be designed so that the wear limit is reached at a favorable point in time for replacing the earth working tools, for example at the end of a shift, at a shutdown time of the earth working machine that is planned in any case, or upon completion of a task that is to be carried out. It can be advantageous for this purpose to reduce the milling output of the earth working machine so that a replacement of the earth working tools does not need to be carried out prematurely. It can also be useful, however, to increase the milling output, and thus tolerate increased wear, if a favorable time period for changing the earth working tools is thereby achieved simultaneously with elevated working output. Advantageously, the above-described characteristic value, constituting a ratio between the wear and the milling work performed, can be used to determine the suitable machine parameters. With a knowledge of the residual wear capacity it is possible to select, in consideration of the material properties, a characteristic value according to which execution of the specified milling work is enabled in such a way that the wear limit of the earth working tools is reached after completion of the milling work. The machine parameters associated with the characteristic value can then be set on the earth working machine in order to carry out the milling work.

The material properties of the substrate to be worked can be determined in simple and current fashion by the fact that the material properties are ascertained during operation of the earth working machine on the basis of machine parameters, in particular on the basis of the milling depth and/or advance rate and/or milling drum rotation speed and/or the torque currently applied to an earth working tool and/or the power currently supplied by the drive engine. These machine parameters provide information as to the material properties, in particular the abrasiveness or hardness, of the substrate to be worked. The rotation speed, torque, and supplied power can be taken directly from the electronic engine control unit (ECU) of the drive engine. The first two parameters can be furnished by the machine controller. Determination of the material properties can be improved by the fact that the wear on the earth working tools which occurs during milling work on the material to be determined, with the existing machine parameters, is also considered in addition to the machine parameters.

The material properties can be sensed in simple fashion by the fact that the operator can select, from a list of different substrate categories, the substrate category or categories suitable for the substrate that is currently to be worked; and that the material properties are associated with those substrate categories; and/or that the operator can directly specify material properties. The result is that the machine operator can easily assess the substrate in situ in consideration of his or her accumulated experience, and can make a corresponding selection.

According to an alternative embodiment of the invention provision can be made that the at least one material property is ascertained from a change in the wear state of at least one earth working tool, in particular of a bit and/or of a bit holder. The change in the wear state can be determined with the aid of a noncontact measurement method or by manual observation.

Advantageously, provision can be made for this purpose that at least one job parameter is taken into consideration for determination of the material property. The material properties of the substrate can easily be determined from the job parameter, for example from a milling work that has been performed, and from the change, associated therewith, in the wear state.

According to a further embodiment of the invention provision can be made that the material properties are determined by means of at least one sensor, in particular by means of radar or ultrasound; and/or that the sensors are mounted on the earth working machine. A variety of sensors can be used in this context in order to allow different properties of the substrate to be determined. By means of ultrasound and radar it is also possible to determine the material properties of material at greater depth, and to consider them when selecting the machine parameters.

The wear on the earth working tools can be further reduced by the fact that the material properties of the material to be removed within a working area are determined in positionally associated fashion; and that the at least one target machine parameter is ascertained as a function of position within the working area and of the material properties existing there. The machine parameters can thereby be respectively adapted to the locally existing material properties, so that the earth working machine can be operated in wear-optimized fashion even in a context of varying substrates.

Provision can preferably be made that at least a calculation unit and a memory unit are associated with the processing device; that the at least one material property and/or the at least one job parameter and/or at least one specified machine parameter is stored in the memory unit; that characteristics diagrams or functional correlations for ascertaining the at least one target machine parameter from the at least one material property and/or from the at least one job parameter and/or from the at least one specified machine parameter and/or from at least one machine parameter are stored in the memory unit; and that the calculation unit determines the at least one target machine parameter with the aid of the characteristics diagrams or of the functional correlations. The wear on the earth working tools is dependent on the machine parameter or parameters to be optimized, on the specified machine parameters, on the material properties, and on the job parameters. This correlation can be stored in the characteristics diagrams, for example in the form of a database, or in the functional correlations. The wear is specified, for example by way of the request for a minimum possible wear or a "target wear," in such a way that, as described, a favorable point in time for replacing the earth working tools is reached. With a knowledge of the job parameters and desired machine parameters, the target machine parameter or parameters for which the requested wear behavior exists can thus be ascertained with the aid of the characteristics diagrams or the functional correlations. The method can be implemented advantageously and with little outlay as a software solution in an existing processing device of a machine controller that is already present.

The object of the invention relating to the earth working machine is achieved in that at least one material property is storable in the memory unit; that at least one characteristics diagram and/or at least one function is stored in the memory unit, the characteristics diagram and/or the function describing a correlation between a wear on the earth working tools and at least the one material property and at least one machine parameter; and that the calculation unit is designed to ascertain, based on the characteristics diagram and/or on the function and on the material property, at least one target machine parameter for which a minimum possible, or a specified, wear on the earth working tools exists. An earth working machine configured in this manner makes it possible to ascertain target machine parameters for which the earth working tools are subjected respectively to a minimum possible wear or to a specified wear. For this, one or more machine parameters are determined, with the aid of the characteristics diagram or the function, as a function of the existing material properties of the material to be removed, in such a way that the desired wear behavior exists.

According to a preferred embodiment of the invention provision can be made that that at least one specified machine parameter is storable in the memory unit; that the at least one characteristics diagram and/or the function additionally describes a correlation of the wear on the earth working tools with the specified machine parameter; and that the calculation unit takes the specified machine parameter into consideration when ascertaining the target machine parameter. The specified machine parameter can be specified by an operator of the earth working machine. The characteristics diagram or the function then represents a correlation among at least the material properties, the machine parameter or parameters to be optimized, the specified machine parameter, and the wear behavior. The machine parameters to be optimized can thus be varied as variable magnitudes, while maintaining the specified machine parameter or parameters, in such a way that the minimum possible wear, or the specified wear, on the earth working tools is achieved.

The working process of the earth working machine can be further improved by the fact that a job parameter is storable in the memory unit; that the at least one characteristics diagram and/or the function additionally describes a correlation of the wear on the earth working tools with the job parameter; and that the calculation unit takes the job parameter into consideration when ascertaining the target machine parameter.

Provision can advantageously be made in this context that a planned change in the material to be worked, for example a milling distance, a milling volume, a milling output, a milling work task, and/or a working time, is storable as a job parameter. By way of the job parameter or parameters, economic specifications for operation of the earth working device can also be considered in the context of selection of the target machine parameters. The selection range for the possible target machine parameters can thus be narrowed by the specification of a job parameter, so that the specifications from the job parameter are achieved.

The target machine parameters are determined by the processing device. In order to allow them to be set on the earth working device, provision can be made that the processing device is connected to the control unit; and that the processing device is designed to transfer the target machine parameters to the control unit; and/or that the processing device is connected to a display unit, and that the processing device is designed to display the target machine parameter or a derivation of the target machine parameter using the display unit. The displayed target machine parameters can then be inputted by an operator into the control device. The control device thereupon sets the machine parameters to the target machine parameters.

For input of the material properties, of the specified machine parameters, or of the job parameters by the operator, provision can be made that an input device is indirectly or directly associated with the processing device. Input can be accomplished, for example, via the connected control unit, so that an input device that is present in any case, and is associated with the control unit, can be used.

In order to allow the data necessary for determination of the target machine parameters to arrive at the processing device, provision can be made that the processing device is designed to receive actual machine parameters and/or specified machine parameters and/or material properties from the control unit. Data that are available in any case to the control unit, for example the actual machine parameters, as well as data that are delivered to the control unit, can thus be conveyed to the processing device.

A knowledge of the material properties of the substrate to be worked is essential for optimization of the machine parameters. These material properties can be sensed without additional outlay by the fact that the processing device and/or the control unit is designed to ascertain material properties during operation of the earth working machine on the basis of machine parameters, in particular on the basis of the milling depth and/or advance rate and/or milling drum rotation speed and/or the current torque applied to an earth working tool and/or the power currently supplied by the drive engine. For this purpose, for example, the milling depth, machine advance, milling drum rotation speed, the torque applied to the working tools, and/or the power currently supplied by the drive engine can be delivered to the processing device or the control unit. From these machine parameters the processing device or the control device can then draw a conclusion as to the material properties, in particular the abrasiveness or hardness of the substrate to be worked. The rotation speed, torque, and supplied power can be taken directly from the electronic engine control unit (ECU) of the drive engine. The milling depth and the machine advance are present in the control unit of the earth working machine, or can be inputted into it. Determination of the material properties can be improved by the fact that the wear on the earth working tools that occurs during milling work on the material to be determined, with the existing machine parameters, is also considered in addition to the machine parameters.

The processing device can be associated with the earth working machine or with a separate system unit. A separate system unit can be connected, for example, to one or more earth working machines via a wireless connection, and can specify the target machine parameters for them.

BRIEF DESCRIPTION OF THE DRAWINGS

The invention will be explained in further detail below with reference to an exemplifying embodiment depicted in the drawings, in which.

DETAILED DESCRIPTION

Figure 1:
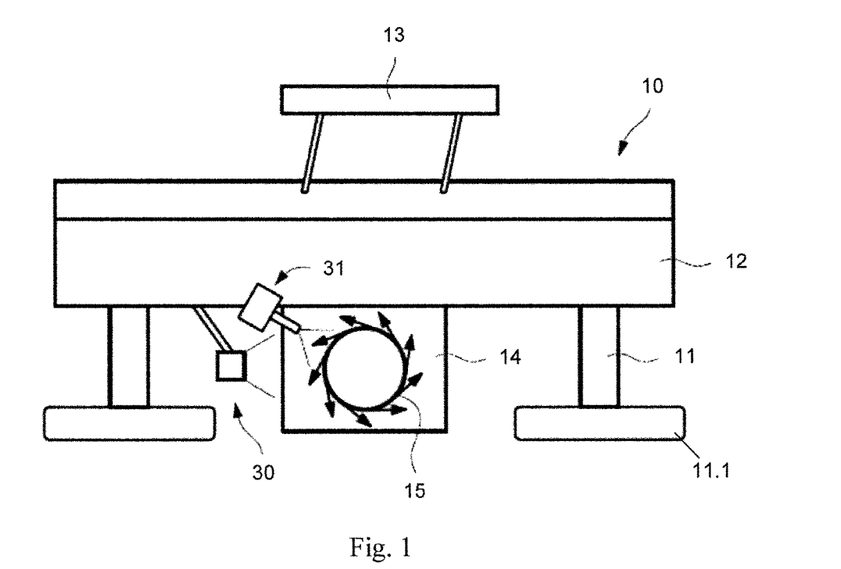
FIG. 1 is a schematic depiction and side view of a milling machine.

FIG. 1 symbolically depicts a milling machine 10, for example a surface miner, a road milling machine, or the like, in which a machine body 12 is carried by four drive units 11.1, for example crawler drive units, connected to machine body 12 vertically adjustably via lifting columns 11. Road milling machine 10 can be operated from a control station 13. A milling drum 15 is arranged in a milling drum box 14.

Figure 2:
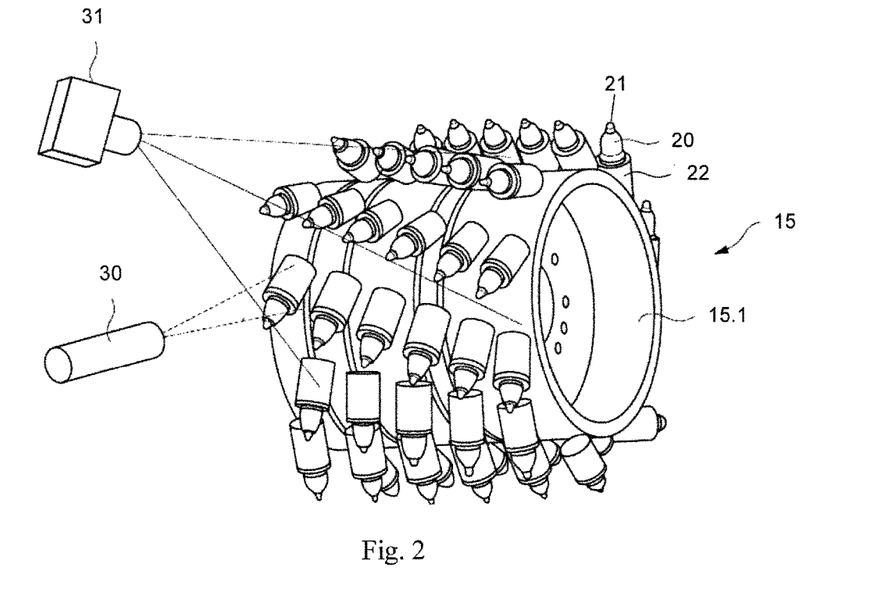
FIG. 2 shows a milling drum of the milling machine in accordance with FIG. 1, having an example of a surveying device based on the triangulation principle.

In the embodiment depicted, milling machine 10 offers the possibility of measuring in noncontact fashion the wear state of bits 20 and of bit holders 22 shown in FIG. 2. A light source 30 and a camera 31 are associated for that purpose with milling drum 15.

During use, machine body 12 is moved at a specified advance rate over the substrate to be worked, in which context bits 20 arranged on the rotating milling drum 15 remove the substrate. The vertical position and rotation speed of milling drum 15 can be adjusted.

FIG. 2 shows milling drum 15 in more detail. A plurality of bit holders 22 are mounted on the surface of a milling tube 15.1 of milling drum 15. A bit 20 is held in each bit holder 22. Bit 20 comprises a bit tip 21 made of a hard material, in particular of carbide metal. In the present example bit holders 22 are welded directly onto milling drum 15. The use of quick-change holder systems is, however, also conceivable. Here a base part, in which bit holder 22 is releasably fastened, is welded onto milling drum 15.

Figure 3:
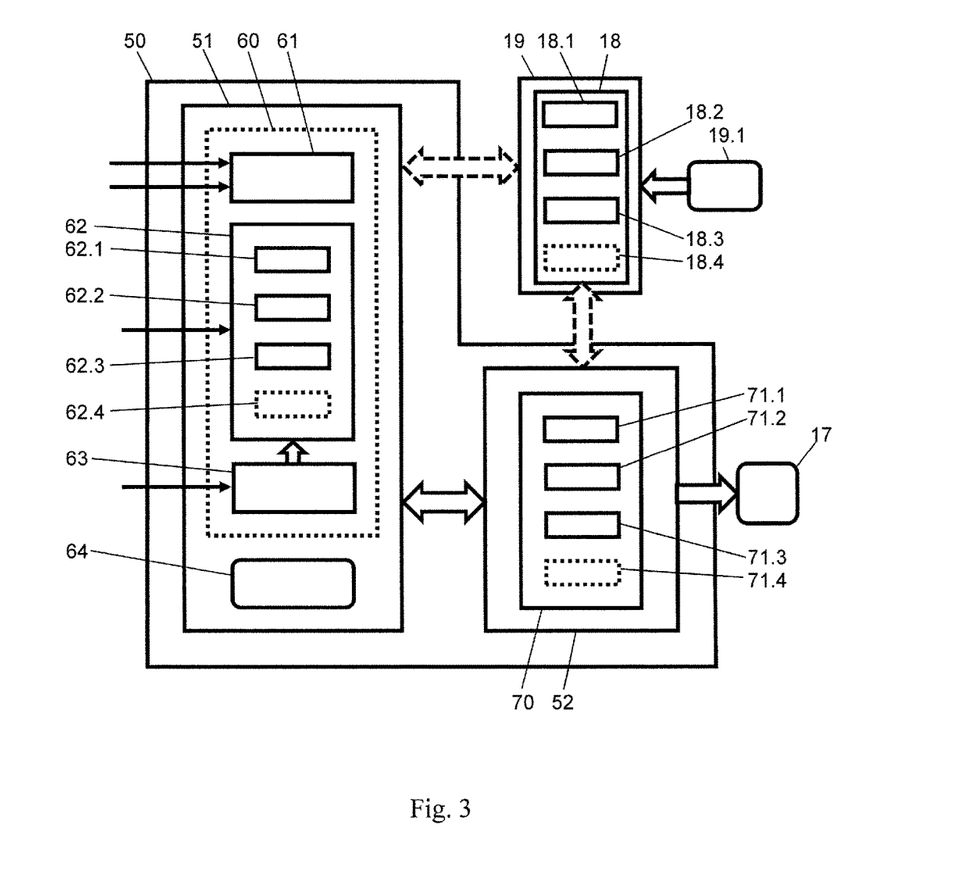
FIG. 3 schematically depicts a processing device having a memory unit and a calculation unit.

The wear rate of the earth working tools, in the present exemplifying embodiment of bits 20 and of bit holders 22, is determined substantially by two factor groups shown in FIG. 3:
1. Machine parameters 18.1, 18.2, 18.3, 18.4 of milling machine 10, e.g.
   a. Milling depth
   b. Advance rate
   c. Milling drum rotation speed
   d. Engine output
   e. Torque
2. Material properties 61 of the substrate to be removed, e.g.
   a. Abrasiveness
   b. Hardness
   c. Material type (e.g. asphalt, concrete, etc.)
   d. Material composition
   e. Temperature For given material properties 61, the wear behavior of the earth working tools can be influenced by the selection of the settable machine parameters 18.1, 18.2, 18.3, 18.4. Proceeding therefrom, according to the present invention an expert system is furnished in order to assist a machine operator in the selection of suitable machine parameters 18.1, 18.2, 18.3, 18.4 to optimize the wear on the earth working tools.

In order for wear to occur on the earth working tools, the earth working machine must have performed a certain milling work. This milling work can be measured, for example as a milled mass, as a milled volume, and/or as a milled travel distance, etc. The milling work performed can be ascertained, for example, directly on an earth working machine.

The milling machine is controlled via control unit 19. By way of this, the machine operator can influence or directly set the current machine parameters 18.1, 18.2, 18.3, 18.4.

In order to ascertain suitable target machine parameters 71.1, 71.2, 71.3, 71.4, also shown in FIG. 3, for wear-optimized operation of the earth working machine, material properties 61 must be known. These can be sensed indirectly. For example, samples can be taken in the area to be milled (e.g. test holes), and can be evaluated. If the substrate to be worked is, for example, a traffic route, it is then optionally possible to access data that were saved during the process of installing the traffic surface (e.g. characteristics of the applied pavement).

It is also conceivable to use available mine categorizations. General hardness/abrasiveness categories are defined for mines, for example "hard, not abrasive," "moderate, not abrasive," "soft, abrasive," etc. From these categories, the category appropriate for the planned travel segment can be selected. Maps having the corresponding data can be stored in a memory of the earth working machine. If the earth working machine additionally possesses a device for determining its position (e.g. GNSS or GPS), the current material properties 61 can be determined on the basis of the stored maps as a function of that position.

Material properties 61 can also be ascertained by evaluating machine parameters 18.1, 18.2, 18.3, 18.4, since material properties 61 correlate directly with those machine data. For the same milling depth, milling drum rotation speed, and advance rate, for example, a hard material will require a higher engine output and greater torque than a soft material.

A further possibility for determining material properties 61 is that a machine driver estimates the material characteristic values. The material characteristic values can advantageously be divided into categories for this purpose. For example, categories such as "hard/not abrasive" or "soft/abrasive" can be provided. The categories are advantageously presented to the machine driver for selection, for example on a display. The machine driver can indicate further ground parameters that narrow down material properties 61. The material type, for example concrete or asphalt, etc., can be indicated by the machine driver. The pertinent material properties 61 are then associated with these material types. Material properties 61 can be determined more accurately by indicating further parameters, for example a ground temperature or an ambient temperature. An indication as to a layer structure, for example a 2-cm thick top layer above an 8-cm thick binder layer, as well as optionally the composition of those layers, can also be provided by the machine driver.

Material properties 61 can also be ascertained from the previous wear on the earth working tools. The wear behavior can be determined for this purpose with the aid of a wear scanner such as the one depicted in FIGS. 1 and 2 in the form of the noncontact measurement system made up of camera 31 and light source 30. The wear scanner preferably ascertains the profile of at least one bit 20. The wear behavior can be determined from a comparison of the profile between two measurements, and material properties 61 can be ascertained from that behavior. For this, for example, a change in length or a change in volume of bit 20 as compared respectively with an initial length or an initial volume, or between two wear states, can be ascertained. The work that has been performed by the earth working machine, and that has resulted in the wear, is preferably considered in the determination of material properties 61 from the previous wear.

A further possibility for determining the previous wear behavior and, therefrom, material properties 61, involves a manual monitoring of the earth working tools, for example by the machine driver. The wear behavior can be accomplished based on the replacement intervals of bits 20 or by imaging the wear state of bits 20, for example upon bit replacement. The number of bits 20 to be replaced in the context of a maintenance operation can also be evaluated. The number can be determined, by counting, by the respective technician. Bits 20 can furthermore be equipped with an RFID chip so that the number of bits 20 replaced can be determined automatically. A further possibility for automated determination of the number of bits 20 replaced is to arrange a sensor in a tool (bit ejector, hammer) for driving bits 20 out of bit holders 22, or to evaluate acoustic signals that occur upon bit replacement.

Advantageously, material properties 61 are described and further processed in combined fashion regardless of how they were determined, for example in the form of the aforementioned categories or of suitable categories.

Job parameters 63 characterize a requested working output of the earth working machine. This can be, for example, in the form of an area or distance to be milled per unit time, or a volume to be removed per unit time. A milling work task to be performed, or an available task time, can also be specified as a job parameter 63. In addition, job parameters 63 can be incorporated indirectly via the specification of machine parameters 18.1, 18.2, 18.3, 18.4 connected therewith, for example the advance rate and milling depth. Lastly, job parameters 63 describe a planned change in the material to be worked. The requirements in terms of machine parameters 18.1, 18.2, 18.3, 18.4 which result from a specified job parameter 63 are often in conflict with the requirements that result from a desired low wear. In the context of optimization of machine parameters 18.1, 18.2, 18.3, 18.4, target machine parameters 71.1, 71.2, 71.3, 71.4 are therefore preferably selected so that job parameters 63 are complied with and the minimum possible wear on the earth working tools in that context is present.

If machine parameters 18.1, 18.2, 18.3, 18.4 and material properties 61 are known, the wear rate on the earth working tools can be estimated. For example, an abrasive material will cause faster wear than a nonabrasive material. A large milling depth will furthermore bring about greater wear than a shallow milling depth. Provision is therefore made according to the present invention to optimize at least one machine parameter 18.1, 18.2, 18.3, 18.4 in such a way that the slowest possible wear rate on the earth working tools exists. Consideration is preferably given in this context to having the earth working machine simultaneously produce the greatest possible working output.

FIG. 3 schematically depicts a processing device 50 having a memory unit 51 and a calculation unit 52. Memory unit 51 and calculation unit 52 are bidirectionally connected (symbolized by an arrow) by means of data lines. Both are optionally in bidirectional communication (symbolized by dashed arrows) with control unit 19 of the earth working machine. A display unit 17 is connected to processing device 50. An input unit 19.1 is associated with control unit 19.

Material properties 61, a specified machine parameter set 62, job parameters 63, and characteristics diagrams 64, for example in the form of databases, can be stored in memory unit 51. In the present exemplifying embodiment three specified machine parameters 62.1, 62.2, 62.3, and optionally further specified machine parameters 62.4, are associated with specified machine parameter set 62. Material properties 61, specified machine parameter set 62, and job parameters 63 together form a specified data set 60, as symbolized by the dashed border.

Characteristics diagram or diagrams 64 stored in memory unit 51 describe the correlation between the wear on the earth working tools and at least one material property 61 and at least one machine parameter 18.1, 18.2, 18.3, 18.4. Characteristics diagrams 64 that consider multiple material properties 61 and machine parameters 18.1, 18.2, 18.3, 18.4 are preferably present. Consideration can also be given in characteristics diagrams 64 to the fact that machine parameters 18.1, 18.2, 18.3, 18.4 can influence one another. Instead of characteristics diagrams 64 it is also possible to store in memory unit 51 functional correlations on the basis of which the wear on the earth working tools can be inferred in consideration at least of a material property 61 and of a machine parameter 18.1, 18.2, 18.3, 18.4.

Calculation unit 52 is preferably embodied as a microprocessor. It ascertains, from specified data set 60 stored in memory unit 51 and from characteristics diagrams 64, a target machine parameter set 70. In the exemplifying embodiment shown, target machine parameter set 70 contains three target machine parameters 71.1, 71.2, 71.3. Further target machine parameters 71.4 can, however, also be provided.

Target machine parameter or parameters 71.1, 71.2, 71.3, 71.4 that are thus ascertained can be transmitted directly to control unit 19. Alternatively, it is possible for target machine parameters 71.1, 71.2, 71.3, 71.4 to be displayed to the operator on a display unit 17. This can be accomplished as a direct display of the ascertained target machine parameters 71.1, 71.2, 71.3, 71.4. It is also possible, however, to display to the operator only those changes to the currently set machine parameters 18.1, 18.2, 18.3, 18.4 which are necessary in order to optimize wear. In addition, the effect to be expected upon acceptance of the proposed target machine parameter 71.1, 71.2, 71.3, 71.4, for example the wear reduction to be expected, can also be displayed on display unit 17.

If target machine parameters 71.1, 71.2, 71.3, 71.4 are transmitted directly to control unit 19, provision can preferably be made that, in order to prevent undesired interactions with the machine control system, a confirmation by the operator must occur before target machine parameters 71.1, 71.2, 71.3, 71.4 are set.

In the simplest case it may be that only one material property 61 of the substrate to be worked is specified. Specified data set 60 thus encompasses only this at least one material property 61. In this case it is also only this one material property 61 that is considered when ascertaining target machine parameters 71.1, 71.2, 71.3, 71.4. Upon a comparison of specified data set 60 with the stored characteristics diagrams 64, all target machine parameters 71.1, 71.2, 71.3, 71.4 are thus ascertained in such a way that wear-optimized operation of the earth working machine is possible.

As described previously, material properties 61 can be determined and can be inputted indirectly or directly by an operator into processing device 50. Alternatively, material properties 61 can be ascertained as described and transferred to memory unit 51. This is symbolized by arrows directed to the block of material properties 61.

It is furthermore possible for at least one specified machine parameter 62.1, 62.2, 62.3, 62.4, for example a milling depth or an advance rate, to be specified by the machine operator in addition to the one or more material properties 61.

Specified machine parameters 62.1, 62.2, 62.3, 62.4 thus represent the machine parameters that are predefined and are not optimized. Specified data set 60 thus encompasses material properties 61 as well as specified machine parameter or parameters 62.1, 62.2, 62.3, 62.4.

Specified machine parameter 62.1, 62.2, 62.3, 62.4 is then accepted as a target machine parameter 71.1, 71.2, 71.3, 71.4. In addition, the at least one specified machine parameter 62.1, 62.2, 62.3, 62.4 is considered as a part of specified data set 60, together with the at least one material property 61, in the determination of the remaining target machine parameters 71.1, 71.2, 71.3, 71.4. Upon comparison of specified data set 60 with characteristics diagrams 64 stored in memory unit 51, the machine parameters not specified by the machine operator are thus ascertained, as target machine parameters 71.1, 71.2, 71.3, 71.4, in such a way that wear-optimized operation of the earth working machine is possible in consideration of the at least one material property 61 and of the specified machine parameter or parameters 62.1, 62.2, 62.3, 62.4.

Specified machine parameters 62.1, 62.2, 62.3, 62.4 of specified machine parameter set 62 can be inputted by an operator, once again symbolized by an arrow directed to specified machine parameter set 62. Alternatively thereto, specified machine parameters 62.1, 62.2, 62.3, 62.4 or some of specified machine parameters 62.1, 62.2, 62.3, 62.4 can be transmitted by control unit 19 or derived from job parameters 63 and stored in memory unit 51. Job parameters 63 can likewise be specified by an operator.

A machine setting, for example an advance rate, can thus be inputted, for example, as a current first machine parameter 18.1 in control unit 19 and accepted into memory unit 51 as a specified machine parameter 62.1. In addition, further current machine parameters 18.1, 18.2, 18.3, 18.4, such as the milling depth or the rotation speed of milling drum 15, can be accepted into memory unit 51 as specified machine parameters 62.1, 62.2, 62.3, 62.4 from control unit 19.

Processing device 50 that is depicted furthermore makes it possible to optimize wear on the earth working tools while operation of the earth working machine is ongoing. In this context, machine parameters 18.1, 18.2, 18.3, 18.4 currently set on control unit 19 are accepted into memory unit 51 as specified machine parameters 62.1, 62.2, 62.3, 62.4 and are considered upon creation of specified data set 60.

Calculation unit 51 can thus ascertain an optimized target machine parameter set 70 in which at least one machine parameter deviates from the currently set machine parameters 18.1, 18.2, 18.3, 18.4, in order to optimize operation of the machine. The discrepant parameter can be displayed to the machine operator as indicated above, or can be transferred directly to control unit 19.

If job parameters 63 are specified in addition, or alternatively, to specified machine parameter set 62, they are also considered as part of specified data set 60 in the determination of target machine parameters 71.1, 71.2, 71.3, 71.4.

At least one material property 61 is therefore delivered to memory unit 51 in order to carry out the method according to the present invention. Optionally and advantageously, further material properties 61 and specified machine parameters 62.1, 62.2, 62.3, 62.4 and/or job parameters 63 can be stored in memory unit 51. Calculation unit 52 reads out from memory unit 51 the specified data set 60 thus constituted, and ascertains therefrom, with the aid of characteristics diagrams 64 or of the functional correlations, target machine parameter set 70 for wear-optimized operation of the earth working machine.

The control system depicted in FIG. 3 is advantageous in particular when different material properties 61 of the substrate to be worked (e.g. a hard spot) are present in the working area of the earth working machine, and/or when material properties 61 are ascertained during operation by the earth working machine. It is thus possible for machine parameters 18.1, 18.2, 18.3, 18.4 that enable wear-optimized operation under the existing conditions (material properties 61 of the earth substrate when working deployment begins) already to have been set on the machine at the beginning of the task. If material properties 61 change during working, and if this is identified by the earth working machine, for example by ascertaining material properties 61 via machine parameters 18.1, 18.2, 18.3, 18.4, via the wear occurring during the milling work, or by way of stored maps having material properties 61 and a position determination by means of GPS, a change then occurs in specified data set 60. Upon a comparison of the modified specified data set 60 with the characteristics diagrams stored in memory unit 51, optimized target machine parameters 71.1, 71.2, 71.3, 71.4 for the modified boundary conditions are then ascertained.

The control system shown in FIG. 3 is moreover also usable when no information regarding material properties 61 of the substrate to be worked is available at the beginning of working service. At the beginning of the working process the machine operator sets machine parameters 18.1, 18.2, 18.3, 18.4 on the basis of his or her experience, and begins milling work. Machine parameters 18.1, 18.2, 18.3, 18.4 that have been set, and additional parameters of the earth working machine, are then monitored during the milling process. For example, a milling depth and advance rate having been set by the machine operator, the engine controller can be monitored. For example, it is possible to monitor the torque and/or rotation speed that is needed in order to achieve the current milling depth and advance rate. The wear occurring on the milling tools can furthermore be observed in the context of a specific milling work task. Conclusions as to material properties 61 can thereby be drawn. Once material properties 61 have been ascertained in this manner, specified data set 60 can be created and, in consideration of characteristics diagrams 64, target machine parameters 71.1, 71.2, 71.3, 71.4 can be ascertained. The latter can then be presented to the machine operator as a recommendation for wear-optimized operation of the earth working machine, or can be set via control unit 19.

In addition to optimization of machine parameters 18.1, 18.2, 18.3, 18.4 for minimum possible wear on the earth working tools, optionally in consideration of specified machine parameters 62.1, 62.2, 62.3, 62.4 and job parameters 63, it can be useful to permit greater wear or to bring about less wear, by adapting job parameters 63 or specified machine parameters 62.1, 62.2, 62.3, 62.4, if, for example, more favorable replacement times for the earth working tools are thereby achieved. Such favorable replacement times can be shutdown times for the earth working machine which are scheduled in any case, the end of a shift, or completion of a milling work task that is to be carried out. The wear rate can then be influenced, by appropriate selection of target machine parameters 71.1, 71.2, 71.3, 71.4, in such a way that the earth working tools have reached their wear limit at the favorable replacement time. It is thereby possible, for example, to avoid the need to exchange the earth working tools shortly before completion of a milling work task, for example dismantling of a road. In addition, a task can be completed with a higher milling output, and thus more quickly, if at the end of the task the earth working tools reach a wear state, even in the context of operation with the minimum possible wear, that makes replacement of the earth working tools before the beginning of a new milling work task seem useful.

In order to optimize target machine parameters 71.1, 71.2, 71.3, 71.4 in such a way that the earth working tools have reached their wear limit at a favorable replacement time, the current wear state or residual wear capacity of the earth working tools must be known. This can be accomplished, for example, by way of the noncontact measurement method shown in FIGS. 1 and 2. Alternatively, the wear state can also be sensed by way of a visual inspection, or it can be calculated with a knowledge of the previous operating conditions of the earth working machine, in particular of machine parameters 18.1, 18.2, 18.3, 18.4 that were used and of material properties 61 of the substrate that was removed.

From the change in the wear state of the earth working tools, and from the task performed in that context, it is furthermore possible to determine a characteristic value that describes the wear behavior. The characteristic value represents a ratio between the wear and the task performed. It can be calculated, for example, as a change in the length or volume of a bit 20 with respect to a milled volume that has been worked or to a milled mass. Characteristic values of this kind can then be associated with various material properties 61 and settings of machine parameter sets. It is then possible to select, for operation of the earth working machine, the machine parameter set which exhibits the smallest, or the suitable, characteristic value for the material properties, and which conforms to specified machine parameters 62.1, 62.2, 62.3, 62.4. The suitable characteristic value, and thus the suitable machine parameters 18.1, 18.2, 18.3, 18.4, are obtained, for example, from the remaining residual wear capacity of the earth working tools and from the amount of work to be carried out until a suitable replacement time for the tools is reached. Characteristics diagrams 64 can be assembled from multiple characteristic values for various boundary conditions, for example different material properties.

Figure 4:
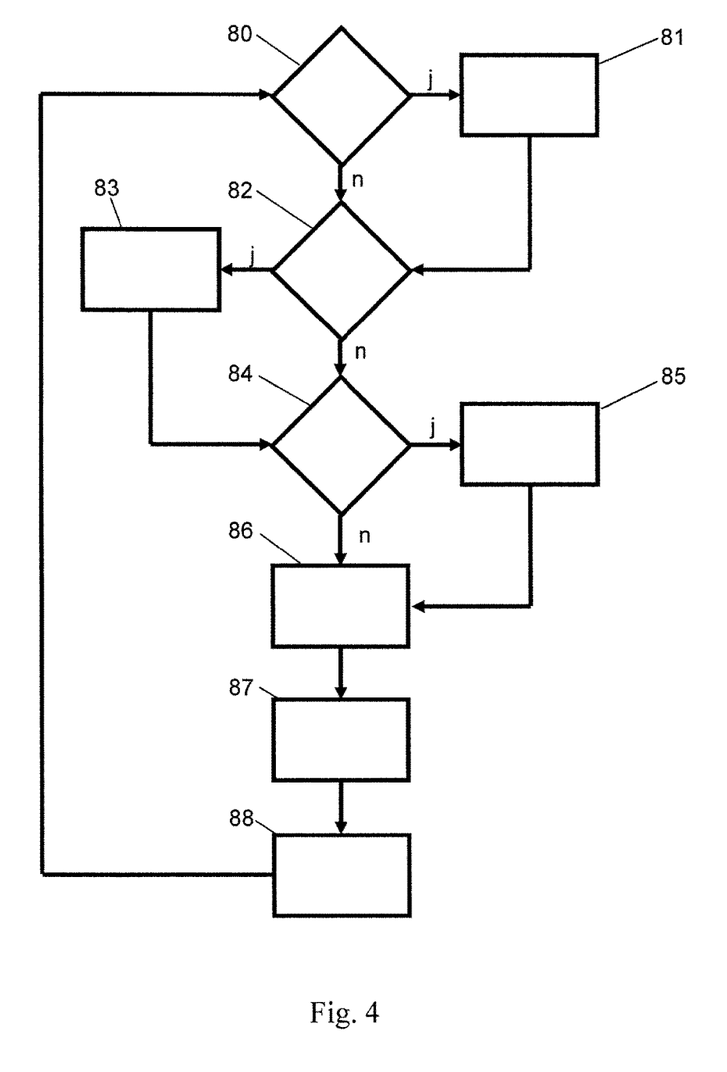
FIG. 4 is a flow chart for ascertaining the parameters suitable for wear-optimized operation of an earth working machine.

FIG. 4 is a flow chart for ascertaining the parameters suitable for wear-optimized operation of the earth working machine.

A first query 80 identifies whether material properties 61 of the substrate to be removed are unknown, or whether changes in material properties 61 have occurred or may have occurred as compared with the previous ascertainment of the optimum operating parameters. If an acquisition of material properties 61 is necessary, this occurs in the first block 81. Material properties 61 can be, for example, entered by the operator, determined from a stored map, or ascertained by the earth working machine.

If the current material properties 61 are known, the second query 82 identifies whether specified machine parameters 62.1, 62.2, 62.3, 62.4 are to be considered. If this is the case, in the second block 83 specified machine parameters 62.1, 62.2, 62.3, 62.4 can be, for example, entered by the machine operator, or ascertained from machine parameters 18.1, 18.2, 18.3, 18.4 currently set in control unit 19 of the earth working machine.

The subsequent, third query 84 ascertains whether additional job parameters 63 for the planned working deployment of the earth working machine are to be considered. They can then be inputted by the operator in the third block 85.

From the data thereby ascertained, specified data set 60 is created in the fourth block 86. This data set takes into consideration the at least one material property 61 as well as optionally the existing specified machine parameters 62.1, 62.2, 62.3, 62.4 and/or job parameters 63.

In the fifth block 87, specified data set 60 is compared with characteristics diagrams 64 stored in memory unit 51, and the wear-optimized target machine parameters 71.1, 71.2, 71.3, 71.4 are ascertained therefrom.

In the sixth block 88, target machine parameters 71.1, 71.2, 71.3, 71.4 are outputted. Either these can be directly displayed to the operator on display unit 17, or recommendations for modifying machine parameters can be displayed to the operator, for example a reduction in the advance, or an increase in the rotation speed, of milling drum 15. Alternatively, target machine parameters 71.1, 71.2, 71.3, 71.4 can also be transferred to control unit 19 and, preferably after confirmation by the operator, set directly.

After the sixth block 88 the preceding steps can be cycled through again beginning with the first query 80. This is useful in particular when material properties 61 can change during working of the substrate. In addition, changes made manually by the operator to machine parameters 18.1, 18.2, 18.3, 18.4 can be accepted into specified data set 60 as new specified machine parameters 62.1, 62.2, 62.3, 62.4, and taken into consideration when the wear-optimized target machine parameters 71.1, 71.2, 71.3, 71.4 are ascertained.

Figure 5:
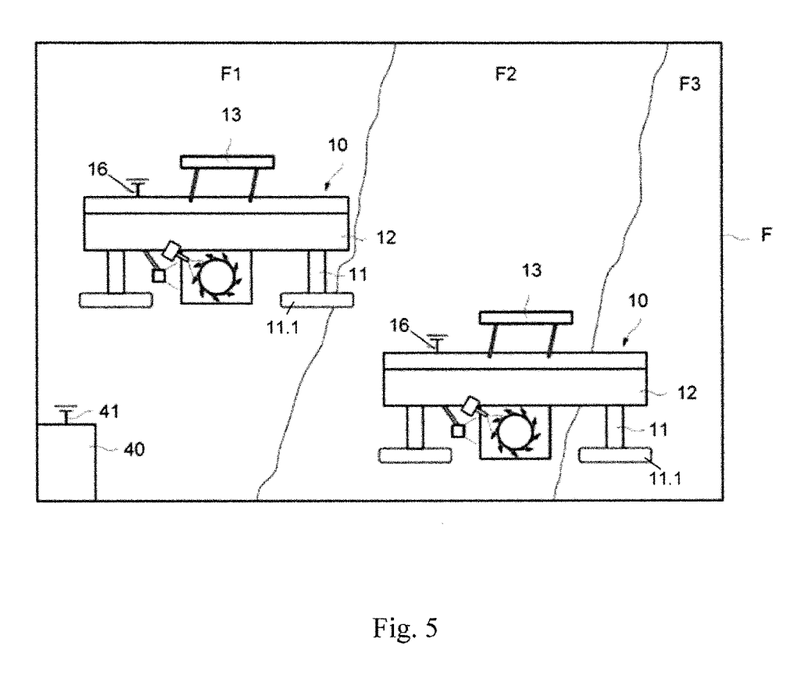
FIG. 5 schematically depicts a working situation with two milling machines.

FIG. 5 illustrates a milling area F, for example a mine, in which several milling machines 10 are working. Milling area F contains a raw material deposit in which material properties 61 change in sub-areas F1, F2, F3. An external system unit 40 is depicted symbolically at the edge of milling area F. Said unit is in wireless communication with milling machines 10 via a transmitting and receiving apparatus 41. Processing device 50 shown in FIG. 3, having calculation unit 52 and memory unit 51, is associated with system unit 40.

Hardness and abrasion categories, constituting material parameters, are associated with sub-areas F1, F2, F3 in mine maps. These mine maps are stored in memory unit 51 of processing device 50. Based on the hardness and abrasion categories, processing device 50 ascertains the appropriate target machine parameters 71.1, 71.2, 71.3, 71.4 for sub-areas F1, F2, F3 and sends them to milling machines 10, taking into consideration job parameters 63 and specified machine parameters 62.1, 62.2, 62.3, 62.4 that may be specified. These can, for example, be sent to system unit 40 from milling machines 10 by means of second transmitting and receiving devices 16 provided thereon, or can be transferred to system unit 40 directly from a further input device.

Milling machines 10 can be operated with different current machine parameters 18.1, 18.2, 18.3, 18.4 in the various sub-areas F1, F2, F3, in such a way that the most favorable, or the desired, wear behavior on the earth working tools exists in each case.

In a further variant embodiment of the invention, material properties 61 of the various sub-areas F1, F2, F3 can be ascertained, for example, by a preceding milling machine 10. This can be accomplished, as described above, on the basis of the existing current machine parameters 18.1, 18.2, 18.3, 18.4. Material properties 61 are then sent to system unit 40, whereupon the optimized target machine parameters 71.1, 71.2, 71.3, 71.4 are ascertained therein by calculation unit 52. They can then be transmitted in positionally resolved fashion to the two milling machines 10.

In a further embodiment that is not depicted, milling machines 10 can also be in direct radio contact with one another, so that system unit 40 can be omitted. Target machine parameters 71.1, 71.2, 71.3, 71.4 are then preferably ascertained by one milling machine 10 and transmitted to the second milling machine 10. Target machine parameters 71.1, 71.2, 71.3, 71.4 adapted for the various sub-areas F1, F2, F3 can be determined, or uniform target machine parameters 71.1, 71.2, 71.3, 71.4 for the entire milling area F can be determined.

Alternatively, processing device 50 can be arranged on milling machine 10. Advantageously, provision can be made in this context that a mine map is electronically processed, and thus stored, in memory unit 51. In addition, milling machine 10 possesses a position determination system (for example a GPS system) and ascertains target machine parameters 71.1, 71.2, 71.3, 71.4 additionally as a function of current position and the stored mine data.

The invention claimed is:

1. An earth working machine comprising:
   at least one milling drum having earth working tools mounted thereon;
   a vertical adjustment system for setting a milling depth;
   a drive engine;
   a machine controller for setting actual machine parameters for operation of the earth working machine;
   a processing device having an associated memory;
   wherein one or more of the processing device and the machine controller is configured to ascertain at least one material property during operation of the earth working machine on the basis of one or more machine parameters selected from the group of: the milling depth; advance rate; milling drum rotation speed; current torque applied to an earth working tool; and power currently supplied by the drive engine;
   wherein the memory has stored therein at least one described correlation between a wear on the earth working tools, at least one material property of a material to be removed, and at least one machine parameter,
   wherein the processing device is configured to ascertain, based on the stored correlation and on the ascertained at least one material property, at least one target machine parameter for optimized wear on the earth working tools.

2. The earth working machine according to claim 1, wherein the memory has stored therein at least one specified machine parameter, and a correlation of the wear on the earth working tools with the specified machine parameter; and
   the processing device is configured to take the specified machine parameter into consideration when ascertaining the target machine parameter.

3. The earth working machine according to claim 1, wherein the memory has stored therein a job parameter, and a correlation of the wear on the earth working tools with the job parameter; and
   the processing device is configured to take the job parameter into consideration when ascertaining the target machine parameter.

4. The earth working machine according to claim 3, wherein the stored job parameter comprises a planned change in the material to be worked, corresponding to one or more of a milling distance, a milling volume, a milling output, a milling work task, and a working time.

5. The earth working machine according to claim 1, wherein the processing device is connected to the machine controller and configured to transfer the at least one target machine parameter to the machine controller,
   wherein the machine controller is configured to set one or more of the actual machine parameters for operation of the earth working machine to match a corresponding one or more of the at least one target machine parameter.

6. The earth working machine according to claim 1, wherein the processing device is connected to a display unit, and the processing device is configured to display the at least one target machine parameter or a derivation of the at least one target machine parameter using the display unit.

7. The earth working machine according to claim 1, wherein an input device is associated with the processing device.

8. The earth working machine according to claim 1, wherein the processing device is configured to receive from the machine controller one or more of actual machine parameters, specified machine parameters and material properties.

9. The earth working machine according to claim 1, wherein the processing device is remotely connected to the earth working machine via a wireless connection.

10. A method for wear-optimized operation of an earth working machine having earth working tools, the method comprising:

grouping one or more settable machine parameters into a machine parameter set for controlling the machine, wherein the one or more machine parameters are selected from a group comprising a milling depth, an advance rate, a milling drum rotation speed, a torque currently applied to the earth working tools, and power currently supplied by a drive engine;

ascertaining at least one material property during operation of the earth working machine on the basis of the one or more machine parameters; and as a function of the ascertained at least one material property of a material to be removed, ascertaining at least one target machine parameter in order to establish wear-optimized operation.

11. The method according to claim 10, wherein the at least one target machine parameter in ascertained further in order to optimize a working output of the earth working machine.

12. The method according to claim 10, further comprising indicating the at least one target machine parameter or a derivation thereof to an operator of the earth working machine during a working process of the earth working machine.

13. The method according to claim 10, further comprising setting at least one of the settable machine parameters corresponding to the at least one target machine parameter.

14. The method according to claim 13, further comprising:

prior to completion of an operating process of the earth working machine, inputting from an operator at least one material property of the material to be removed and one or more of specified machine parameters and job parameters; and ascertaining the at least one target machine parameter as a function of at least the input from the operator.

15. The method according to claim 14, wherein the job parameter is a planned change in the material to be worked, selected from a group comprising a milling distance, a milling volume, a milling output, a milling work task, and a working time.

16. The method according to claim 10, wherein the at least one material property is selected from a group comprising an abrasiveness, a hardness, a material type, a material composition, a temperature and a layer structure.

17. The method according to claim 10, further comprising calculating a characteristic value which represents a ratio between a wear on the earth working tool caused by a milling work task performed by the earth working machine and a milling work performed, wherein the characteristic value is calculated from one or more of a material property, a machine parameter of the machine parameter set, and a change in a wear state of at least one earth working tool, and wherein the at least one target machine parameter is determined such that the characteristic value assumes a value as low as possible.

18. The method according to claim 17, wherein the milling work performed is ascertained directly on the earth working machine and received as an output from a machine controller for operation of the earth working machine.

19. The method according to claim 17, wherein the change in the wear state is determined via one or more of:
a noncontact measurement method;
a wear state upon replacement of the at least one earth working tool;
required replacement intervals for the at least one earth working tool; and
a number of earth working tools to be replaced at each replacement interval.

20. The method according to claim 10, further comprising:
sensing the current wear state of at least one earth working tool; and
ascertaining a residual wear capacity until a specified wear limit is reached from the current wear state,
wherein the residual wear capacity is considered in ascertaining the at least one target machine parameter.

21. The method according to claim 10, further comprising:
selection by an operator, from a list of different substrate categories, one or more substrate categories suitable for a substrate that is currently to be worked; and
associating the at least one material property with the selected substrate categories.

22. The method according to claim 10, wherein the at least one material property is ascertained from a change in the wear state of at least one earth working tool.

23. The method according to claim 22, wherein at least one job parameter is taken into consideration for determination of the at least one material property.

24. The method according to claim 10, further comprising determining the at least one material property via at least one sensor mounted on the earth working machine.

25. The method according to claim 10, wherein the material properties of the material to be removed within a working area are determined in positionally associated fashion; and
the at least one target machine parameter is ascertained as a function of position within the working area and of the material properties existing there.

26. The method according to claim 10, wherein at least a processing device having a memory unit is associated with the earth working machine;
wherein the memory has stored therein
the at least one material property,
one or more of at least one job parameter and at least one specified machine parameter, and
characteristics diagrams or functional correlations for ascertaining the at least one target machine parameter from the at least one material property and from the one or more of the at least one job parameter and the at least one specified machine parameter;
wherein the processing device is configured to determine the at least one target machine parameter with the aid of the characteristics diagrams or of the functional correlations.

27. A system for wear-optimized operation of one or more earth working machines, each of the earth working machines having at least one milling drum with earth working tools mounted thereon and a machine controller for setting machine parameters for operation of the respective earth working machine, the system comprising:
a memory having stored therein at least one material property and at least one described correlation between wear on earth working tools, at least one material property of a material to be removed, and at least one machine parameter; and
a microprocessor connected to the one or more earth working machines and configured to
ascertain at least one material property during operation of the earth working machine on the basis of one or more machine parameters selected from the group of: the milling depth; advance rate; milling drum rotation speed; current torque applied to an earth working tool; and power currently supplied by the drive engine, and;

ascertain, based on the stored at least one correlation and on the ascertained at least one material property, at least one target machine parameter for optimized wear on the earth working tools for the particular earth working machine, wherein the machine controller for the particular earth working machine is configured to set one or more of the respective machine parameters to match a corresponding one or more of the target machine parameters.

28. The system of claim 27, wherein the memory has stored therein at least one specified machine parameter, and a correlation of the wear on the earth working tools with the specified machine parameter; and the microprocessor is configured to take the specified machine parameter into consideration when ascertaining the target machine parameter.

29. The system of claim 27, wherein the memory has stored therein a job parameter, and a correlation of the wear on the earth working tools with the job parameter; and the microprocessor is configured to take the job parameter into consideration when ascertaining the target machine parameter.

30. The system of claim 29, wherein the stored job parameter comprises a planned change in the material to be removed, corresponding to one or more of a milling distance, a milling volume, a milling output, a milling work task, and a working time.

31. The system of claim 27, wherein the microprocessor is connected to the machine controller and configured to transfer the at least one target machine parameter to the machine controller, wherein the machine controller is configured to set one or more of the actual machine parameters for operation of the earth working machine to match a corresponding one or more of the at least one target machine parameter.

32. The system of claim 27, wherein the microprocessor is connected to a display unit, and the microprocessor is configured to display the at least one target machine parameter or a derivation of the at least one target machine parameter using the display unit.

* * * * *